Jan. 7, 1958     S. M. NARZISI     2,819,363
BRAKE FLUID LEVEL INDICATOR
Filed May 8, 1953
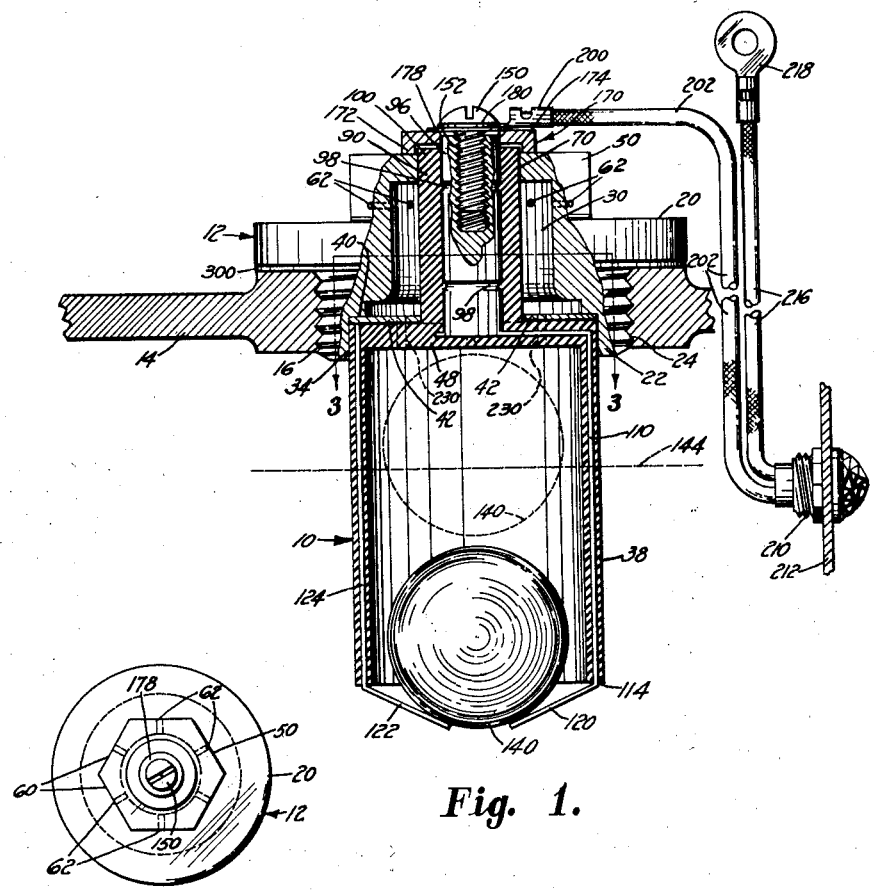
Fig. 1.
Fig. 2.
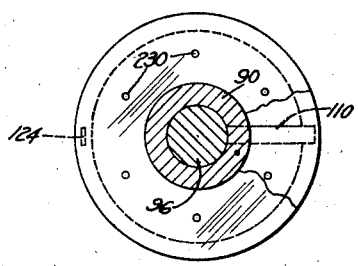
Fig. 3.
INVENTOR.
S. M. Narzisi
BY

United States Patent Office 2,819,363
Patented Jan. 7, 1958

2,819,363

BRAKE FLUID LEVEL INDICATOR

Samuel M. Narzisi, Omaha, Nebr.

Application May 8, 1953, Serial No. 353,763

1 Claim. (Cl. 200—84)

This invention relates to the detection of leakage in the hydraulic brake system of motor vehicles and more particularly it is an object of this invention to provide an indicator adapted to fit into the master cylinder to indicate the danger immediately to the driver as soon as hydraulic fluid in the master cylinder has reached a dangerously low level.

A particular object is to prevent many tragic automobile accidents by providing a more economical indicating device of this type than heretofore.

I am aware that there have been other attempts made to perfect a brake fluid level indicator. However, these have functioned through the use of a vertically moving plunger having a float fixed to its lower end to the end that the plunger moves downwardly at times when brake fluid level is low. Such devices have a disadvantage in that their moving parts are in danger of binding and a further disadvantage in that the switch mechanism necessary is susceptible of wear. This type of indicator has a further disadvantage in that the cost of the switch mechanism is excessive.

It is therefore an object of this invention to provide an indicator which can be more economically constructed and which is less susceptible to wear and is without the danger of binding, thus being more sure in its operation.

I am also aware that other attempts have been made to provide a fluid level indicator having a free floating contact member. The contact member has been made of cylindrical shape having a conically shaped lower end heretofore. This construction has a disadvantage in that it tends to concentrate the wear on the float due to arcing and to contact with the contact points during switching action. This wear is concentrated in an area of circular shape.

It is an object of my invention to spread potential wear out over the entire outer side of a float by providing a spherical float which will contact the contact points at a different place on the float each time.

A further object is to provide contact members which extend upwardly through a float guide tube rather than extending around the outer side thereof.

Yet a further object is to provide an indicator having contact members which are flat on their upper side and are downwardly inclined toward each other in a manner best adapted to receive and make contact with a spherical ball float.

Yet a further object is to provide a brake indicator having a ball guide formed of any suitable non-conductive material such as plastic or the like, the ball guide being integral with and having an upper section adapted to insulate a terminal from surrounding parts of the master cylinder cap.

Still a further object is to provide a construction such that the screw employed at the terminal of the indicator functions as a means for cooperating with a non-conductive member for supporting the guide tube assembly and for securing it to the cap of the master cylinder as well as functioning as a terminal screw.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

Figure 1 is a side elevation of the indicating device of this invention shown partly in section and fixed to the cap of a master cylinder.

Figure 2 is a top plan view of the indicator of Figure 1 shown on a smaller scale.

Figure 3 is a view-in-section taken along the line 3—3 of Figure 1.

The brake fluid indicating device of this invention is generally indicated at 10 in Figure 1 and is shown as attached to a cap 12 of a master cylinder of the brake system of an automobile, the upper portion of the master cylinder being shown at 14 having a threaded opening therethrough shown at 16.

The cap 12 is modified in accordance with this invention and is of a special shape for use herewith. The cap 12 has an outwardly extending flange portion 20 having a downwardly extending portion 22 provided with a threaded exterior wall 24 for fitting the threaded opening 16 of the master cylinder.

The cap 12 is further provided with a hollow center indicated at 30 which opens downwardly and is provided with a larger bottom portion 34 of a cylindrical shape for receiving the upper end of a ball-contact guide tube 38 as later described.

Upwardly from the cylindrically shaped lower portion of the wall of the hollow center 30 is a shoulder 40 which surrounds the cylindrical lower portion 34 and is adapted to receive a metal conductive washer 42 thereagainst which is disposed between the shoulder 40 and the upper transverse wall 48 of the guide tube 38. The cap 12 further has a center portion which protrudes upwardly as best seen at 50, and is of a hexagonal or other shape for receiving a wrench to tighten the cap 12 into place. The portion 50 may also be described as a portion adapted to be gripped by a wrench of a wrench-grippable portion and has a plurality of normally vertical flat sides as indicated at 60 through which passages 62 are provided for this invention for permitting the escape of air or excess fluid from the interior of the master cylinder. The openings 62 are in communication with the hollow interior 30 of the cap 12.

At the center of the grip portion 50 of the cap is a vertical opening 70 therethrough of circular shape in top plan. The opening 70 is to receive an upper end portion 90 of the guide tube member 38. The upper end portion 90 can be referred to as a suspending portion as its lower end is attached to the upper transverse wall 48 of the guide tube 38. The upper end portion 90 is preferably of cylindrical shape and of a size for snugly fitting in the opening 70.

The portion 90 is preferably formed of insulating material similarly to the guide tube 38 so as to separate the cap 12 from the inner terminal or anchor member 96 which is disposed inside the upper end portion 90 and is imbedded therein, preferably.

The terminal member 96 is of conductive material and preferably has two or more grooves extending around the outside thereof as seen in Figure 1 at 98, the purpose of the grooves being to more firmly fix the terminal member 96 in the suspending portion 90.

The terminal member 96 is preferably of generally cylindrical shape and extends from a point above the uppermost surface 100 of the suspending portion 90 downwardly to a point adjacent but spaced from the bottom of the transverse wall 48.

At its lower end the terminal member 96 is attached to a conductive electrically connecting member 110 of elongated shape which extends to the edge of the transverse wall 48 and then downwardly through the interior of the guide tube 38, coming out the bottom of the guide tube 38 at 114, it being understood that all parts of the member 110 which are above the point 114 are imbedded in the guide tube 38 which is of non-conductive material.

The member 110 has an inwardly and downwardly inclining portion 120 which functions as a contact member in cooperation with a second contact member 122 which is disposed on the opposite side of the guide tube from the member 120. The contact member 122 is also a portion of a conductive member 124 which leads upwardly through the guide tube 38 to the conductive washer 42 disposed transversely across the top of the transverse wall 48. It will be seen that there is an electrical connection to the washer 42 to the member 124 and that the washer 42 is an electrical contact with the cap 12 and is therefore grounded.

The conducting members 110 and 124 can also be called conductors or contact members and each has an upper portion in the transverse member 48, a central portion in the tube 38, and a lower portion or inwardly and downwardly inclining portion 120 or 122 respectively.

In the guide tube 38 a spherical ball 140 is provided, the ball 140 being of conductive material, at least on its surface, and being adapted to make contact between the contact members 120 and 122 when the ball 140 is in the full line position shown in Figure 1.

When the ball 140 is in the dotted line position shown in Figure 1 due to the level of fluid in the master cylinder being at an adequate level as indicated by the dotted lines 144, then the ball 140 is out of contact with the contact members 120 and 122.

At the upper end of the suspending member 90 a terminal screw 150 is provided which is threadedly secured in a threaded opening 152 in the upper end of the contact member 96. Between the head of the screw and the upper surface of the portion 50 of the cap is a spacing member 170 which is preferably of a circular shape in top plan view and has an annular flange 172 surrounding the circumference of it and extending downwardly therefrom so as to leave a recess 174 in the center of the bottom thereof for freely receiving the upwardly projecting upper end of the suspending member 90.

The spacing member 170 is adapted to engage the upper side of the cap 12 with its flange 172 whereby when the screw 150 is tight the flange 172 will press against the upper side of the portion 50 of the cap for holding the suspending portion 90 upwardly in the cap.

Above the spacing member 170 is a washer 178, which latter is disposed beneath a member 200 fixed to the end of a wire 202, which wire leads through a lamp fixture 210 which can be mounted on the dash 212 of an automobile. It will be understood that the warning light 210 can be fixed to a clamp or bracket instead of to the dashboard whereby, if preferred, the warning light can be placed under the dashboard or wherever desired without the necessity of converting the dashboard in the installation of the indicating device of this invention.

From the lamp 210 a second wire 216 extends to a fitting 218 which latter is placed in contact with the "hot" or battery terminal of the ignition switch of the automobile by means which are believed unnecessary to show here.

It will be understood the ignition switch is thought to be the best power source for the signal. However, another power source could also be used.

The passages 62 for the escape of air or excess fluids from the interior of the master cylinder were described above. It is necessary for cooperation with the passages 62 that there be other passages 230 which are shown in dotted lines in the extending upwardly transverse portions 48 of the guide member 38 and through the washer 42. The number of the apertures 230 should preferably correspond in number and size with the passages 62.

It will be seen that when the fluid level of the master cylinder has reached a dangerously low point that the ball 140 will move downwardly with the level of the brake fluid and come in contact with the contact members 120 and 122, causing the light fixture 110 to light up for warning the driver. If desired, an audible signal can be used in place of the light 210 or in addition thereto, such as a buzzer, or the use of the horn of the motor vehicle.

The length, or depth, of the guide tube 38 must be sufficient for cooperating with the size of the master cylinder and the normal position of the fluid therein so as not to warn of brake fluid level unduly early or unduly late.

A gasket 300 is disposed beneath the cap 12, as is customary for tightly securing master cylinder caps.

As thus described it will be seen that this invention has provided a more efficient, reliable, economical, endurable brake fluid level indicating device than heretofore.

From the foregoing description, it is thought to be obvious that a brake fluid level indicator constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

A brake fluid level indicator adapted to fit into the master cylinder of a vehicle hydraulic brake system comprising: a conductive cap member adapted to fit tightly into the cap opening of said master cylinder, said cap member having at least one aperture therethrough for the escape of air and brake fluid and having an opening therethrough at its center, a guide tube formed of electrically insulating material extending downwardly from said cap into said master cylinder substantially beneath the normal position of the surface of the fluid therein, a transverse member of insulating material disposed across the top of said guide tube and secured thereto, said transverse member having at least one aperture cooperative with said cap member aperture for permitting escape of air and brake fluid outwardly through said transverse member and said cap, an upwardly extending member of insulating material attached to said transverse member and extending upwardly into and snugly fitting said opening in said cap, two conductors having central portions imbedded in said guide tube and lower portions protruding inwardly from said guide tube, means electrically connecting the upper end portion of one of said conductors and said conductive cap, the upper portion of the other conductor extending transversely with respect to the center portion thereof and extending inwardly through said transverse member, a terminal member connected to said upper portion of said other conducting member and extending through said upwardly extending member to the upper side of said cap, and a float in said guide tube and having an electrically conductive surface for engaging the lower ends of said conductors.

References Cited in the file of this patent

UNITED STATES PATENTS

| | | |
|---|---|---|
| 1,642,413 | Faunce | Sept. 13, 1927 |
| 1,768,446 | Gron | June 24, 1930 |
| 2,253,260 | Alcorn | Aug. 19, 1941 |
| 2,388,645 | Rowe et al. | Nov. 6, 1945 |
| 2,586,449 | Whitten | Feb. 19, 1952 |
| 2,613,294 | McNea | Oct. 7, 1952 |
| 2,615,105 | Whitney | Oct. 21, 1952 |
| 2,661,411 | Berger | Dec. 1, 1953 |
| 2,706,754 | Palladino | Apr. 19, 1955 |